June 7, 1960  S. J. VICKERS  2,939,353
PIVOTED BAR CUTTER WITH AUTOMATIC CLAMP
Filed Jan. 25, 1955  4 Sheets-Sheet 1
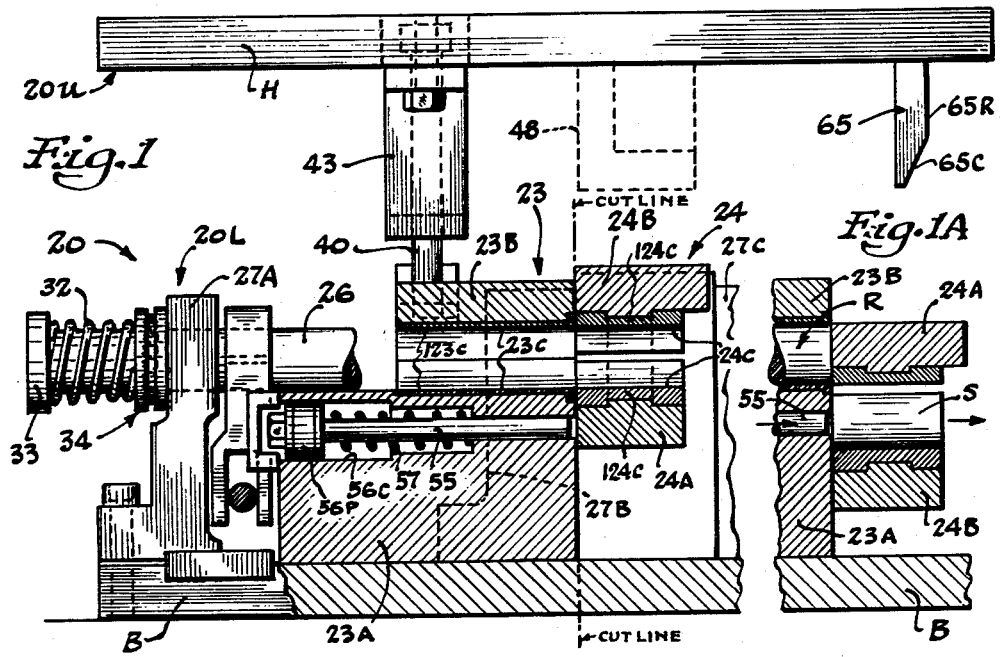
Fig. 1
Fig. 1A
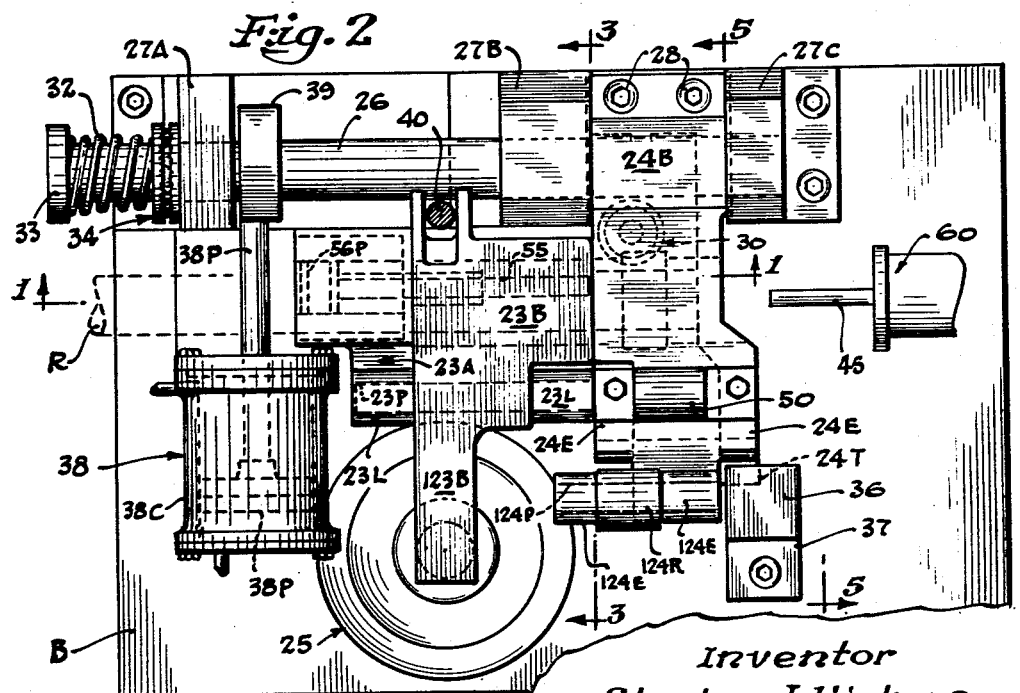
Fig. 2
Inventor
Stanley J. Vickers
By Wallace and Cannon
Attorneys

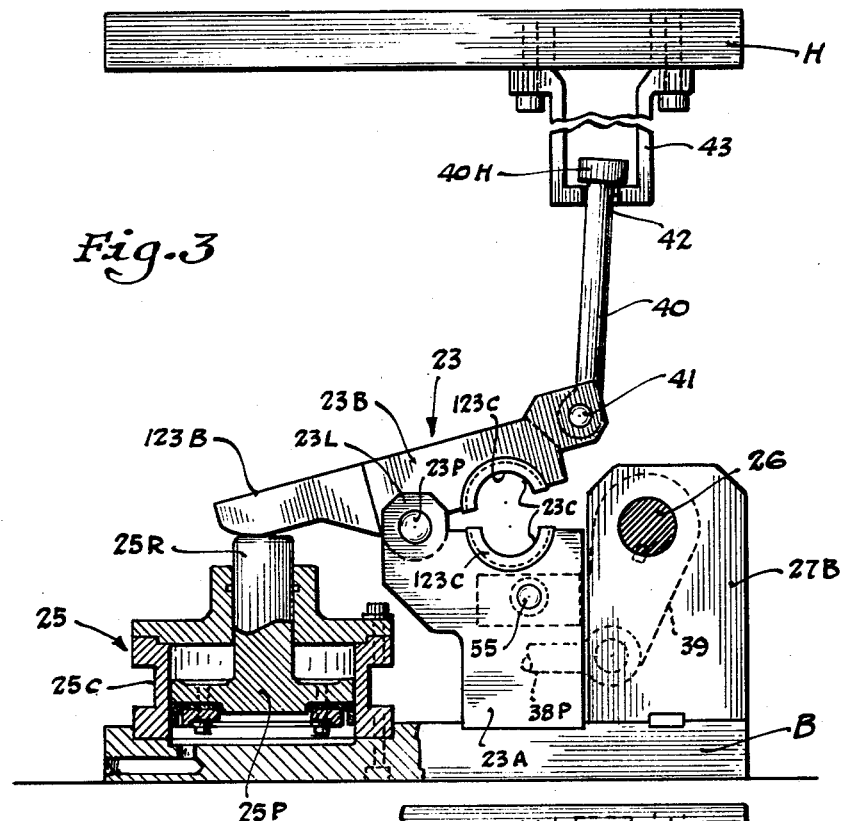
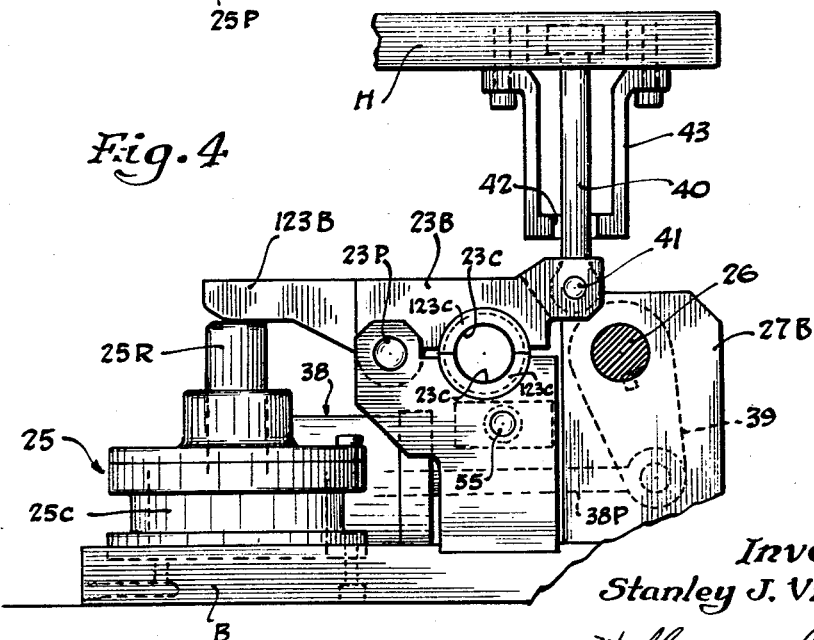

June 7, 1960 S. J. VICKERS 2,939,353
PIVOTED BAR CUTTER WITH AUTOMATIC CLAMP
Filed Jan. 25, 1955 4 Sheets-Sheet 3
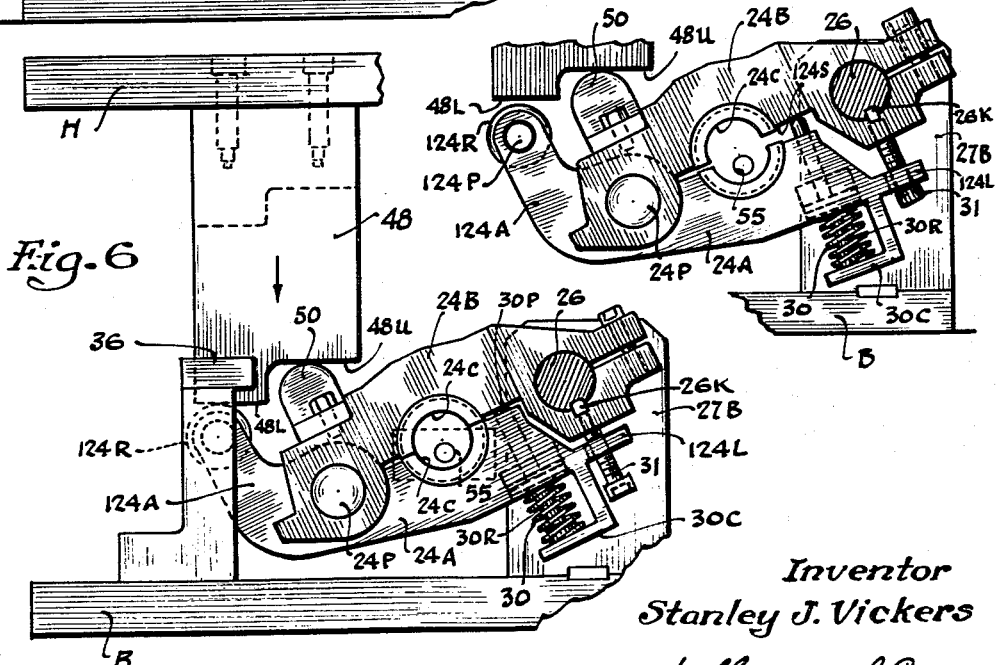
Inventor
Stanley J. Vickers
By Wallace and Cannon
Attorneys

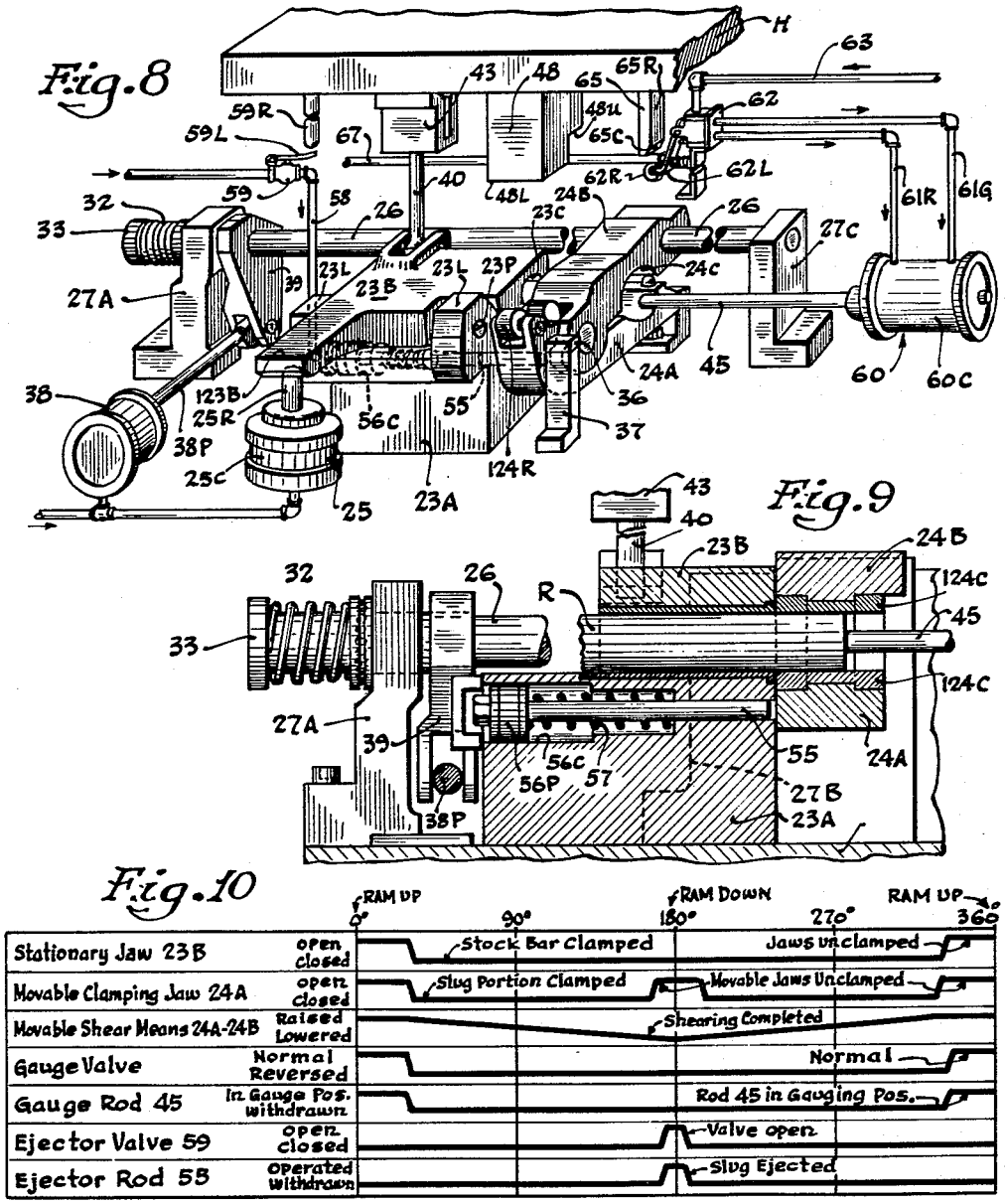

United States Patent Office 2,939,353
Patented June 7, 1960

2,939,353
PIVOTED BAR CUTTER WITH AUTOMATIC CLAMP

Stanley J. Vickers, Palos Park, Ill., assignor to American Brake Shoe Company, New York, N.Y., a corporation of Delaware Filed Jan. 25, 1955, Ser. No. 484,009

12 Claims. (Cl. 83—82)

This invention relates to shearing apparatus and particularly to rod or bar shearing apparatus adapted for the production of forging slugs.

When rod or bar stock is cut into relatively short lengths that are to constitute slugs for use in forging operations, it is quite important that the slugs be sheared in a uniform manner so that the resulting work produced in the forging operation will be simplified and rendered uniform. In the past, it has been found that in the production of forging slugs by the shearing of rod or bar stock there is a tendency for the shearing plane to be displaced angularly from the desired normal relationship with respect to the axis of the rod or slug. The maintainance of such a normal relationship of the shearing plane to the axis of the bar is quite important in assuring the accurate work and in simplifying the forging operation, and to enable a truly squared shearing operation to be attained is the primary object of this invention. Other and related objects of the present invention are to enable such a truly squared shearing operation to be attained in an extremely simple manner and through the use of shearing mechanism that is simple, economical and sturdy in character.

Shearing of rod or bar stock for the production of forging slugs is usually performed in shearing mechanism that may be associated with and operated by a punch press of conventional construction and, it is a further object of the present invention to afford a shearing apparatus that may be associated with such a punch press and which will assure the production of truly squared sheared ends on the slugs. Further and related objects are to enable the length or size of the slugs to be accurately determined by an automatic gauging means and to enable the shearing slugs to be automatically ejected from the shearing apparatus.

Other and more specific objects of the present invention are to perform shearing operations on rod or bar stock while the stock bar and the slug are both firmly clamped in the relatively movable shearing elements of the apparatus, and to enable the clamping and unclamping of the shearing elements to be automatically attained in predetermined operative sequence with respect to automatic movements of shiftable gauging means and shiftable slug ejecting means.

Other and further objects of the present invention will be apparent from the following description and claims and are illustrated in the accompanying drawing which, by way of illustration, shows a preferred embodiment of the present invention and the principles thereof and what I now consider to be the best mode in which I have contemplated applying these principles. Other embodiment of the invention embodying the same or equivalent principles may be used and structural changes may be made as desired by those skilled in the art without departing from the present invention and the purview of the appended claims.

In the drawings:

Fig. 1 is a front elevationl view, taken partially in longitudinal vertical cross section on the line 1—1 of Fig. 2, and showing a shearing apparatus embodying the features of the invention;

Fig. 1-A is a fragmentary view showing the movable shearing elements at the end of a shearing operation;

Fig. 2 is a plan view of the lower portion of the apparatus shown in Fig. 1;

Fig. 3 is a transverse vertical section view taken substantially along the line 3—3 of Fig. 2;

Fig. 4 is a view similar to Fig. 3 and showing stationary shearing jaws in their clamped position;

Fig. 5 is a transverse sectional view taken substantially along the line 5—5 of Fig. 2;

Fig. 6 is a view similar to Fig. 5 and showing the movable shearing jaws at the end of the actual shearing operation but before unclamping of such jaws;

Fig. 7 is a view showing the movable shearing jaws after further downward movement and in their released or unclamped relationship;

Fig. 8 is a front perspective view of the apparatus;

Fig. 9 is a vertical section view similar to Fig. 1 and showing gauge rod in its gauging position; and Fig. 10 is a timing chart.

For purposes of disclosure, the invention is herein illustrated as embodied in a shearing unit 20 that comprises an upper section 20U and lower section 20L, and this unit is adapted to perform shearing operations on an elongated stock bar such as the bar R, Fig. 1-A, to produce short pieces or slugs S that are accurately sheared in planes perpendicular to the axis of the stock bar or rod R. The shearing apparatus 20 is adapted to be mounted in a conventional punch press for operation by the punch press, and to enable this to be done, the upper unit 20U of the apparatus comprise a head plate H that is adapted to be secured to the ram of such a press, while the lower unit 20L includes a base plate B that is adapted to be mounted on the bed of such a punch press. The head plate H and the base plate B carry cooperating apparatus or mechanism whereby shearing operations under the present invention may be performed. It might be pointed out that the head plate H carries the primary actuating and control mechanism which cooperate with the operative shearing and related mechanism that are carried on the base plate B.

The shearing apparatus 20 includes a stationary shearing means 23 and a cooperating movable shearing means 24, each of which comprises a pair of relatively movable clamping jaws so that during the actual shearing operation, the stock bar R and the end thereof that is being sheared to form the slug S are firmly clamped in the portions thereof adjacent to the shearing plane.

With respect to the stationary shearing means 23, a relatively heavy block 23A is mounted in fixed position on the base plate B, and adjacent to its forward end as viewed in Figs. 2 and 8 the block 23A has a pair of upstanding mounting lugs 23L and these lugs serve as part of a pivotal mounting for an upper clamping jaw 23B, the forward end portion of which extends between the lugs 23L and is pivoted thereon by a horizontal pivot shaft 23P. Forwardly of the pivot shaft 23P, the upper jaw member 23B has a forwardly projecting arm 123B upon which an upwardly acting resilient force may be applied to rock the jaw 23B from its open position shown in Fig. 3 to its closed or clamping position shown in Fig. 4. In the present instance such resilient clamping force is applied to the arm 123B by means of an air operated piston and cylinder device 25. The cylinder 25C of the actuating unit 25 is mounted on the base plate B, while the piston rod 25R extends upwardly from the piston 25P and engages the lower face of the arm 123B.

Rearwardly of the pivot pin 123P, the upper face of the block or jaw 23A and lower face of the jaw 23B have mating clamping recesses 23C formed therein, the relationship of these clamping surfaces being such that when the jaw 23B is in its closed position of Fig. 4, these clamping surfaces 23C engage and firmly clamp the surfaces of the rod R that is to be sheared. As herein shown, the surfaces 23C are formed by hardened insert members 123C so as to enable longer wear to be attained.

The movable shearing means 24 are best shown in Figs. 2, and 5 to 8, of the drawings, and as therein shown, the movable shearing means comprise an upper jaw member 24B and a lower jaw member 24A. The rear end of the jaw 24B is fixed on a horizontal rock shaft 26 that is mounted in three spaced mounting standards 27A, 27B and 27C that are in turn secured on the base plate B. The jaw 24B is secured on the shaft 26 as by clamping through the use of a pair of clamping screws 28. The shearing movement of the movable shearing means 24 is accomplished by rocking of the shearing means in a counter-clockwise direction, Fig. 5, from the relationship shown in Fig. 5 to the relationship shown in Fig. 6, and during such shearing movement the lower clamping jaw 24A is held in its clamping relationship with respect to the jaw 24B, as shown in Fig. 5. Thus, as will be evident in Figs. 2, 5 and 8, the forward end of the upper jaw 24B has a pair of forwardly projecting, laterally spaced ears 24A, and the forward end portion of the lower jaw 24A extends between these two ears and is pivoted thereto by means of a relatively heavy horizontal pivot shaft 24P that extends through the ears 24E and the jaw 24A. Forwardly of the pivot shaft 24P, the jaw 24A has an upwardly projecting operating arm 124A. The end of this arm has spaced ears 124E thereon, and a pressure transmission roller 124R is disposed between the ears 124E on shaft 124P. Rearwardly of the pivot shaft 24P, the upper and lower jaws 24A and 24B have clamping surface 24C formed therein in a mating relationship, and this is preferably done by the use of replaceable hardened sleeves 124C.

The lower jaw 24A is normally urged toward the open or released position of Fig. 7 by a constantly acting yielding force that is supplied in the present instance by an expansive spring 30. This spring 30 is mounted on a rigid carrier arm 30C carried on the arm or jaw 24A and an actuating rod 30R is extended through the spring 30 and has a guide or abutment plate 30P fixed thereon so that the spring 30 may urge the rod 30R upwardly against a shouldered surface 124S to urge lower jaw 24A toward its open position. In this connection, it will be recognized that the spring 30 applies a continuous yielding force tending to unclamp or release the jaw 24A. The releasing or unclamping movement that may be applied to the jaw 24A is limited by a stop screw 31 mounted on the member 24B and having its head positioned so that it will be engaged by lugs 124L of the jaw 24A when a predetermined opening movement has been applied to this jaw.

As hereinbefore pointed out, the main jaw 24B is clamped onto the shaft 26 and preferably is keyed thereto, as at 26K. The movable shearing means 24 are held laterally against the face of the stationary shearing means 23 by resilient endwise force applied in a left hand direction, Fig. 1, to shaft 26. As herein shown, this is accomplished by providing a relatively heavy expansive coiled spring 32 about the end of the shaft 26 to the left of the standard 27A. The spring 32 acts against a nut 33 on the left end of the shaft 26, and at the other end against one element of a thrust bearing 34 which bears against the left hand face of the standard 27A.

The shaft 26 has a yielding force constantly applied thereto tending to rock the shaft 26 in a clock-wise direction Fig. 3, and this tends to move the movable shearing means 24 to their normal released relationship shown in Fig. 8 of the drawings. Such normal position is limited by a stop block 36, carried on the standard 37 and disposed in the path of a tooth 24T that is formed on the forward end of one of the mounting ears 24E, as will be evident in Figs. 5 and 8.

The yielding actuating force is in the present instance applied to the shaft 26 by an air powered piston and cylinder device 38, the cylinder 38C of which is stationarily mounted on the base plate B and the piston rod 38P of which extends rearwardly and is pivoted to the lower end of a downwardly projecting arm 39 that is keyed on the shaft 26 just to the right of the mounting standard 27A.

When the ram of the punch press is withdrawn in an upward direction, an opening or unclamping force is applied to the rear end of the upper jaw 23B of the stationary shearing means 23, and as herein shown, this is accomplished by a link 40 pivoted at 41 to the rear end of the jaw 23B and extending through an opening 42 in the cross bar of a depending U-shaped yoke 43 that is bolted to the head plate H. The link 40 has an enlarged head 40H at its upper end disposed within the yoke 43 so that a lost motion connection is provided between the yoke 43 and the rod 40. Near the upper end of the stroke of the ram of the punch press, the head 40H is engaged by the yoke 43 to pivot the jaw 23B from the clamping position shown in Fig. 4 to the unclamped position shown in Fig. 3, and in doing this the piston rod 25R of the air cushion cylinder 25 is forced downwardly, as will be evident in Fig. 3.

From the foregoing description, it will be evident that when the ram of the punch press is in its upper position, the jaw 23B will be unclamped, and the movable shearing means 24 will be in its normal opened relationship of Fig. 8, and the openings between the jaws of the stationary shearing means and the jaws of the movable shearing means will be in substantial alignment so that an elongated work-piece such as the rod R, Fig. 1A, may be moved endwise to the right through the stationary shearing means and into the movable shearing means 24. As will hereinafter be described, such feeding movement is normally governed or limited by a gauge that is brought into its gauging position during the work advancing operation. After withdrawal of the gauging rod 45 in the manner to be described, the machine is in condition for performance of the desired shearing operation. This is accomplished by initiating the normal operating cycle of the ram of the punch press so that the ram moves down through its full stroke and is then withdrawn to its upper position. In the course of such downward movement of the ram, the rod 40 is lowered so as to cause the clamping jaw 23B to become effective, and at about the same time, the actuating roller 124R of the movable shearing means 24 is engaged so as to first cause clamping movement of the jaw 24A and to thereafter cause rocking movement of the shearing means 24B through a shearing movement. Such actuation is effected by an actuating block 48 fixed in a downwardly projecting relation on the head plate H and having a lower actuating surface 48L disposed in alignment with 124R. Thus the surface 48L engages the roller 124L and rocks the jaw 24 about its pivot 24P to the clamped position of Fig. 5, after which continued downward movement of the actuating block 48 causes the movable shearing means 24 to be actuated through a shearing movement to the position shown in Fig. 6 of the drawings. This position is reached shortly before the downward stroke of the ram has been completed, and at this point in the stroke of the ram, an upper actuating surface 48U on the block 48, engages an upwardly projecting abutment lug 50, that is formed on jaw 24B above the pivot 24P. The relationship is such that in continued downward movement of the ram, the jaw 24B is further rocked to the position of Fig. 7, but this movement causes the surface 48L to be in effect retracted or spaced from the roller 124R. This results from the fact that the surfaces 48U and 48L are related in a particular manner to the pivotal axis of the shaft 26. The action is such that while the parts are moving from the position shown in Fig. 6 to the position in Fig. 7, the jaw is permitted to open under the action of its spring cushion 30.

Upon completion of the downward movement of the ram, the slug S that has been sheared from the rod R is located opposite a longitudinally movable ejecting rod 55, as will be evident in Figs. 6, 7 and 1A. Thus, the slug S, as illustrated in Fig. 1A may be ejected by right hand actuation of the ejecting rod 55, and this is accomplished by a piston 56P that is mounted in the block 23A and connected to the left hand end of the rod 55. The piston 56P is mounted in a cylinder 56C formed in the block 23A, and a spring 57 surrounding the rod 55 within this cylinder urges the ejector rod 55 to its left hand or withdrawn position. Air under pressure may be supplied to the left hand end of the cylinder by means including a supply pipe 58 and a normally closed valve 59 which is opened as will be described when the ejecting operation is to take place. The valve 59 is of the normally closed type which may be opened by downward actuation of an operating lever 59L. The valve 59 is automatically opened after the actual shearing has been completed and the jaw 24A has been unclamped, as shown in the timing diagram of Fig. 10. This is accomplished as an incident to the downward movement of the head plate H, and for this purpose a depending operating rod 59R is provided on the head plate H as shown in Fig. 8. The length of the rod 59R is such that it becomes effective on the handle 59L after completion of the shearing operation, and this causes ejection of the sheared slug S from the unclamped shearing jaws.

The gauge rod 45 is automatically moved between its gauging and retracted positions, and for this purpose a piston and cylinder device 60 is provided, the cylinder 60C being mounted on the bed plate B and the gauge rod 45 being connected to or formed as a part of the piston rod of device 60. The rod 45 is aligned with the upper position of the movable shearing means 24 so that the work piece being moved to the right into the movable shearing means 24 will engage the end of the gauge rod 45, as shown in Fig. 9. The air cylinder 60C has supply connections 61G and 61R extended to opposite ends thereof from a control valve 62 which has pressure air supplied thereto by a supply pipe 63. The valve 62 is normally positioned to supply pressure air through the connection 61G to the right hand end of the cylinder 60C, thus to normally cause the gauge rod 45 to assume its left hand or gauging position, and means are provided for automatically reversing the valve 62 prior to the initiation of the downward shearing movement of the shearing means 24 so as to cause the gauge rod 45 to be withdrawn while the shearing means are out of their normal position. To this end the valve 62 has an operating lever 62L thereon with a roller 62R at its end, and this roller 62R is arranged to be engaged by an operating bar 65 that depends from the head plate H. The operating bar 65 has a cam surface 65C adjacent its lower end that engages the roller 62R and reverses the valve 62 early in the downward travel of the head plate H, as indicated in the timing chart of Fig. 10. After such reversal of the valve 62, the roller 62R rides along a vertical dwell surface 65R of the bar 65, thus to maintain the valve 62 in its reversed position while the shearing operation is performed and until the shearing means 24 have returned to their upper or normal position.

When the shearing operation is completed, the valve 62 returns to its normal position so as to cause the gauge rod 45 to assume its gauging position. This is of course desirable in most instances, but it may be noted that under some circumstances the operator may wish to shear a special or longer slug S, and to care for such situations, means are provided for manually reversing the valve 62 so as to cause withdrawal of the gauge rod 45. As herein shown this is accomplished by a slidably mounted valve actuator rod 67 disposed so that one end of the rod 67 may be engaged with the valve handle or lever 62L to reverse the valve 62. The rod 67 extends to a point adjacent the operator's position, and hence the operator may cause withdrawal of the gauge rod 45 in instances where this is desired. The stock bar R may then be advanced to the desired extent and the machine cycle initiated in the normal way. The valve rod 67 may then be released after control of the valve 62 has been assumed by the operating bar 65.

With the shearing apparatus as thus described, the rod or stock bar R is embraced and securely clamped by the two shearing means adjacent to and on opposite sides of the shearing plane and the clamped relation is maintained throughout the shearing stroke. By the use of such a clamped or fully embraced relationship during the shearing stroke it is found that the sheared ends of the stock are maintained or formed in the desired normal relationship to the stock bar, and this materially simplifies and improves the forging operations or the like that are to be performed on the sheared slugs.

Under the present invention automatic gauging and unloading of the work is attained in a simple and effective manner, and the gauging means may be readily disabled in a cycle where a larger cut slug is desired.

Thus while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a rod shearing apparatus, stationary shearing means and movable shearing means movable about a pivot from a starting position through a shearing stroke and beyond the end of such stroke to an unloading position, each of said means comprising a pair of opposed clamping jaws effective when clamped to embrace and firmly clamp a stock bar adjacent to the shearing plane defined between the two shearing means, operating means for moving said movable shearing means about said pivot to said unloading position and for separating the jaws of the two pairs for loading and positioning of a stock bar therein, shiftable ejecting means at said unloading position for ejecting a sheared slug axially when the movable shearing means reach said unloading position, means for clamping both pairs of jaws on such a stock bar and for actuating said movable shearing means through said shearing stroke while maintaining said jaws clamped, means operable when said movable shearing means reach said unloading position to operate said ejecting means, and means operable as an incident to passage of said movable shearing means to unloading position for unclamping the jaws of said movable shearing means when said movable shearing means are in said unloading position.

2. Shearing apparatus of the character described comprising upper and lower units adapted for mounting respectively on the ram and the bed of a punch press for operation by such press, said lower unit having stationary shearing means comprising a fixed jaw and a cooperating shiftable jaw between which a rod or the like may be clamped, a movable shearing means mounted pivotally on said lower unit and comprising a main jaw and a relatively shiftable clamping jaw between which an end portion of such a rod or the like may be clamped, and means carried on said lower unit for urging the jaws of said stationary shearing means toward clamping position, means on said upper unit for unclamping the jaws of said stationary shearing means, actuating means on said upper unit for clamping the jaws of said movable shearing means and for concurrently actuating said movable shearing means through an arcuate shearing stroke while said jaws are maintained in their clamped relation.

3. Shearing apparatus of the character described comprising a stationary lower unit and a movable upper unit adapted for movement through an operating stroke toward and away from said lower unit from an upper position to a lower position, said lower unit having stationary shearing means and movable shearing means pivotally mounted thereon and cooperating in a predetermined vertical shearing plane, said stationary shearing means comprising a fixed jaw and a cooperating shiftable jaw between which a rod or the like may be clamped adjacent said shearing plane, said movable shearing means comprising a main jaw and a relatively shiftable clamping jaw between which an end portion of such a rod or the like may be clamped adjacent said shearing plane, means carried on said upper unit for unclamping said jaws of said stationary shearing means when said upper unit is in its upper position, means carried on said lower unit for clamping said jaws of said stationary shearing means, and means carried on said upper unit for initiating clamping the jaws of both of said shearing means as said upper unit moves from its upper position toward its lower position, and for concurrently actuating said movable shearing means through an acuate shearing stroke while said jaws of said movable shearing means are maintained in their clamped relation.

4. Shearing apparatus of the character described comprising a stationary lower unit and a movable upper unit adapted for movement through an operating stroke toward and away from said lower unit from an upper position to a lower position, said lower unit having stationary shearing means and movable shearing means pivotally mounted thereon and cooperating in a predetermined vertical shearing plane, said stationary shearing means comprising a fixed jaw and a cooperating shiftable jaw between which a rod or the like may be clamped adjacent said shearing plane, said movable shearing means comprising a main jaw and a relatively shiftable clamping jaw between which an end portion of such a rod or the like may be clamped adjacent said shearing plane, means carried on said upper unit for unclamping said jaws of said stationary shearing means when said upper unit is in its upper position, means carried on said lower unit for clamping said jaws of said stationary shearing means, means carried on said upper unit for initiating clamping of the jaws of both of said shearing means as said upper unit moves from its upper position toward its lower position, and for concurrently actuating said movable shearing means through an arcuate shearing stroke about its pivot while said jaws of said movable shearing means are maintained in their clamped relation, means operable to open the jaws of said movable shearing means at the end of said shearing stroke, and shiftable ejecting means operable axially on said slug while said last mentioned jaws are thus opened to eject the sheared slug formed in the shearing operation.

5. Shearing apparatus of the character described comprising a stationary lower unit and a movable upper unit adapted for movement through an operating stroke toward and away from said lower unit from an upper position to a lower position, said lower unit having stationary shearing means and movable shearing means pivotally mounted thereon and cooperating in a predetermined vertical shearing plane, said stationary shearing means comprising a fixed jaw and a cooperating shiftable jaw between which a rod or the like may be clamped adjacent said shearing plane, said movable shearing means comprising a main jaw and a relatively shiftable clamping jaw between which an end portion of such a rod or the like may be clamped adjacent said shearing plane, means carried on said upper unit for unclamping said jaws of said stationary shearing means when said upper unit is in its upper position, means carried on said lower unit for clamping said jaws of said stationary shearing means, means carried on said upper unit for initiating clamping of the jaws of both of said shearing means as said upper unit moves from its upper position toward its lower position, and for concurrently actuating said movable shearing means through an arcuate shearing stroke while said jaws of said movable shearing means are maintained in their clamped relation, means operable to open the jaws of said movable shearing means incidental to attaining the end of said shearing stroke, shiftable ejecting means operable axially of said slug while said last mentioned jaws are thus opened to eject the sheared slug formed in the shearing operation, a gauge member shiftable between a retracted position and an operative position, and means operated under control of said upper unit for causing shifting movements of said gauge member in timed relation to the movements of said movable shearing means.

6. Shearing apparatus of the character described comprising stationary shearing means and movable shearing means cooperating in a predetermined shearing plane, said stationary shearing means comprising a fixed jaw and a cooperating shiftable jaw between which a rod or the like may be clamped in an embracing relation adjacent said plane, said movable shearing means comprising a main jaw pivoted at one end and a relatively shiftable clamping jaw pivoted on said main jaw adjacent the other end of said main jaw and between which an end portion of such a rod or the like may be clamped in an embracing relation adjacent said plane, and means for opening the jaws of both sets, means for clamping the jaws of the stationary shearing means, means for acting on a portion of the clamping jaw of said movable shearing means to shift such clamping jaw to its clamped position and thereafter to operate said movable shearing means through a shearing stroke while said jaws are maintained in their clamped relation.

7. Shearing apparatus of the character described comprising stationary and movable shearing blades cooperating in a predetermined shearing plane, clamping jaws operatively associated with the respective blades for cooperating with the respective blades to embrace and clamp a stock bar adjacent to and on the opposite sides of said plane, the clamping jaws of said movable blades being supported pivotally for operation through an arcuate shearing stroke means for unclamping said jaws and moving said movable blades to a loading relation, means for clamping said jaws and moving said movable shearing blade through a shearing stroke while said jaws are in clamped relation, and means for unclamping the clamping jaw of said movable blade after completion of the shearing stroke.

8. Shearing apparatus of the character described comprising, stationary shearing means having relatively shiftable clamping jaws between which a rod or the like may be clamped, a movable shearing means comprising relative shiftable clamping jaws between which an end portion of such a rod or the like may be clamped for shearing a slug therefrom, means for clamping the jaws of both of said shearing means, actuating means operable through a predetermined stroke for actuating said movable shearing means through an effective shearing stroke while said jaws are maintained in their clamped relation, said actuating means having a terminal stroke continued beyond said predetermined stroke thereof, and unclamping means for the jaws of said movable shearing means operated by said actuating means during said terminal stroke thereof to effect opening of said jaws of said movable shearing means after complettion of said effective shearing stroke to enable the sheared slug to be removed from said last mentioned jaws.

9. In a rod shearing apparatus, stationary shearing means and movable shearing means each comprising a pair of opposed clamping jaws effective when clamped to embrace and firmly clamp a stock bar adjacent to the shearing plane defined between the two shearing means, operating means normally separating the jaws of the two pairs for loading and positioning of a stock bar therein, means acting in opposition to said operating means for clamping both pairs of jaws on such a stock bar, actuating means for actuating said movable shearing means through and beyond an effective shearing stroke while said jaws are maintained clamped to sever a slug from such a stock bar, and means operable during the course of movement of said jaws of said movable shearing means beyond the end of said shearing stroke to effect unclamping of said last mentioned jaws.

10. Shearing apparatus of the character described comprising, stationary shearing means having relatively shiftable jaws between which a rod or the like may be clamped, a movable shearing means having relatively shiftable jaws between which an end portion of such a rod or the like may be clamped and sheared to sever a slug from said rod, means for clamping the jaws of both of said shearing means, actuating means for actuating said movable shearing means through a shearing stroke while said jaws are maintained in their clamped relation to sever such a slug, means operable to open the jaws of said movable shearing means at the end of said shearing stroke, and reciprocable ejecting means operable axially of said slug while said last mentioned jaws are thus opened to eject the sheared slug formed by the shearing operation.

11. Shearing apparatus of the character described comprising stationary and movable shearing blades cooperating in a predetermined shearing plane, and such movable blade being movable from a loading position through a shearing stroke and then into an unloading position, clamping jaws mounted on each of said blades for cooperating with the respective blades to embrace and clamp a stock bar adjacent to and on the opposite sides of said plane, means for locating said blade in said loading position, means for unclamping said jaws when said movable blade is in said loading position, means for clamping said jaws and moving said blade through and beyond an effective shearing stroke while said jaws are maintained clamped, and means operable thereafter and during the course of movement of said blade beyond said effective shearing stroke to move said movable blade to said unloading position and to concurrently unclamp the clamping jaw of said movable blade.

12. Shearing apparatus of the character described comprising stationary and movable shearing blades cooperating in a predetermined shearing plane, clamping jaws mounted on each of said blades for cooperating with the respective blades to embrace and clamp a stock bar adjacent to and on the opposite sides of said plane, means for unclamping said jaws, said movable shearing blades being supported pivotally for rocking movement through an arcuate shearing stroke, means for clamping said jaws, and actuating means spaced from the pivotal support for said movable shearing means for moving said movable shearing blades about the pivotal support for said movable shearing means through an arcuate shearing stroke while said jaws are in clamped relation.

References Cited in the file of this patent

UNITED STATES PATENTS

| | | |
|---|---|---|
| 717,706 | McCool | Jan. 6, 1903 |
| 812,452 | Richards | Feb. 13, 1906 |
| 891,626 | Loss | June 23, 1908 |
| 1,715,138 | Lothrop | May 28, 1929 |
| 1,850,010 | Hall | Mar. 15, 1932 |
| 2,138,543 | Grappe | Nov. 29, 1938 |
| 2,404,901 | Cibs | July 30, 1946 |

FOREIGN PATENTS

| | | |
|---|---|---|
| 328,475 | Germany | Oct. 30, 1920 |
| 564,691 | France | Jan. 8, 1924 |